(12) United States Patent
Sugimoto et al.

(10) Patent No.: US 6,170,682 B1
(45) Date of Patent: Jan. 9, 2001

(54) UNDER-FRAME STRUCTURE

(75) Inventors: Yoshitaka Sugimoto; Kozo Ueta; Yoshihiko Miura; Jun Kashima; Tomohide Saito; Toshitaka Funaki, all of Osaka (JP)

(73) Assignee: The Rinki Sharyo Co. Ltd, Osaka Prefecture (JP)

( * ) Notice: Under 35 U.S.C. 154(b), the term of this patent shall be extended for 0 days.

(21) Appl. No.: 09/193,777

(22) Filed: Nov. 17, 1998

(30) Foreign Application Priority Data

Apr. 24, 1998 (JP) .................................................. 10-114543

(51) Int. Cl.$^7$ ........................................................ B61G 1/00
(52) U.S. Cl. ............................ 213/75 R; 105/3; 105/4.1; 105/8.1; 105/176; 280/441.1; 280/403; 280/494
(58) Field of Search .................................. 105/3, 4.1, 4.4, 105/8.1, 176; 213/75 R; 280/403, 441.1, 494

(56) References Cited

U.S. PATENT DOCUMENTS 4,781,123 * 11/1988 Yoshihara ............................. 105/8.1
5,906,164 * 5/1999 Bildtsen ................................. 105/3

FOREIGN PATENT DOCUMENTS

0279245 * 8/1988 (GB) ..................................... 105/8.1

* cited by examiner

Primary Examiner—S. Joseph Morano
Assistant Examiner—Frantz Jules
(74) Attorney, Agent, or Firm—Vedder Price Kaufman & Kammholz

(57) ABSTRACT

The car under-frame of the invention comprises a planar coupling member 2 projecting from a first car C toward a second car B, a bearing inner ring 3 positioned on the upper side of planar coupling member 2 and secured rigidly thereto, a bearing outer ring 6 disposed on the outer peripheral side of bearing inner ring 3 through balls, a bearing step 5 positioned on the upper side of bearing outer ring 6 and to which the bearing outer ring is rigidly secured, and an articular coupling member 7 projecting from the second car B toward the first car C to grip a mounting arm 5b of bearing step 5. The mounting arm 5b of bearing step 5 is integral with a generally discoid body segment 5a and disposed below the top end face of body segment 5a and extending radially outwardly from either side of body segment 5a.

In accordance with the invention there can be provided a under-frame structure which makes it possible to lower the car floor level without interfering with strength and coupler performance.

3 Claims, 4 Drawing Sheets

UNDER-FRAME STRUCTURE

BACKGROUND OF THE INVENTION

1. Field of the Invention

The present invention relates to a novel under-frame structure which is applicable with advantage to a coupler of a low-floor articulated car, typically a streetcar.

2. Description of the Related Art

FIG. 9 is a schematic plan view for explaining the principle of the under-frame structure of the conventional articular joint. The conventional under-frame comprises a bearing outer ring 51 secured rigidly to a first particular member projecting from a first car C1 toward a second car C2 and a bearing inner ring 52 having a pair of mounting segments 53, 53 adapted to hold a coupling shaft 54, a second articular member 55 projecting from the second car C2 toward the first car C1 to grip said coupling shaft 54, whereby the first and second cars C1, C2 are coupled through a bearing 50.

However, since this conventional under-frame is of a construction such that the bearing 50 and the coupling shaft mounting segments 53, 53 are simply stacked up, a considerable difference in level is inevitable between the first articular member and the second articular member, with the result that the surface level of the floor on which passengers set their feet cannot be sufficiently lowered.

However, particularly in the case of a streetcar, the floor level is preferably as low as possible from the consideration of the ease of boading and unboading by elderly or physically handicapped passengers.

In view of the above demand, the present invention has for its object to provide an under-frame structure which does not present a strength problem or interfere with coupler performance and, yet, makes it possible to lower the level of the floor on which passengers set their feet.

SUMMARY OF THE INVENTION

Developed to meet the above demand, the present invention provides an under-frame structure which comprises a first coupling member secured rigidly to a first car and projecting from said first car toward a second car, a bearing inner ring disposed on the upper side of said first coupling member and secured rigidly thereto, a bearing outer ring disposed through a roller means on the outer peripheral side of said bearing inner ring, a coupling intermediate member which is positioned on the upper side of said bearing outer ring and to which said bearing outer ring is rigidly secured, and a second coupling member which is rigidly secured to said second car and projects from said second car toward said first car to grip the mounting arm of said coupling intermediate member, said mounting arm of said coupling intermediate member being formed integrally with a generally discoid body segment of said coupling intermediate member but positioned below the top end face of said body segment and projecting radially outwardly from either side of said body segment.

The present invention is characterized in that instead of the use of a coupling shaft in the prior art, a coupling intermediate member having a generally discoid body segment and a mounting arm projecting radially outwardly from either side of said body segment is employed. In this coupling intermediate member (referred to briefly as a bearing step in the embodiment), the mounting arms are positioned below the top end face of the body segment so that the floor level can be lowered as compared with the prior art. In other words, since the under-frame of the invention employs a coupling intermediate member comprising a generally discoid segment and a mounting arm projecting from either side thereof as a unit, the floor level of the car can be lowered without presenting a strength problem or interfering with coupler performance.

In the present invention, the body segment of the coupling intermediate member is preferably centrally displaced in an axially upward direction to form a flat top end face. Moreover, preferably the second coupling member has a pair of articular members which, through bearings, grip the mounting arms of said coupling intermediate member. More preferably, the articular member is formed with a flat top end face and the top end face of the body segment and that of the articular member are formed at the same level and coincide with the bottom end face of the floor members of said first and second cars.

DETAILED DESCRIPTION OF THE PREFERRED EMBODIMENTS

The present invention is now described in further detail, reference being had to the preferred embodiments.

Figure 1A:
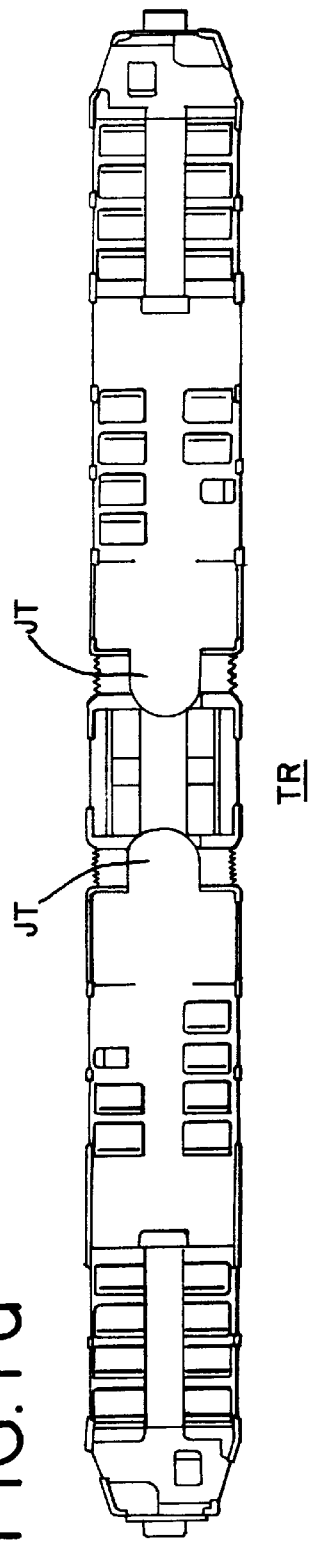
FIG. 1 shows a plan view (a) and front view (b) of a streetcar TR as an example of low-floor articulated car to which the present invention is applied with preference.
Figure 1B:
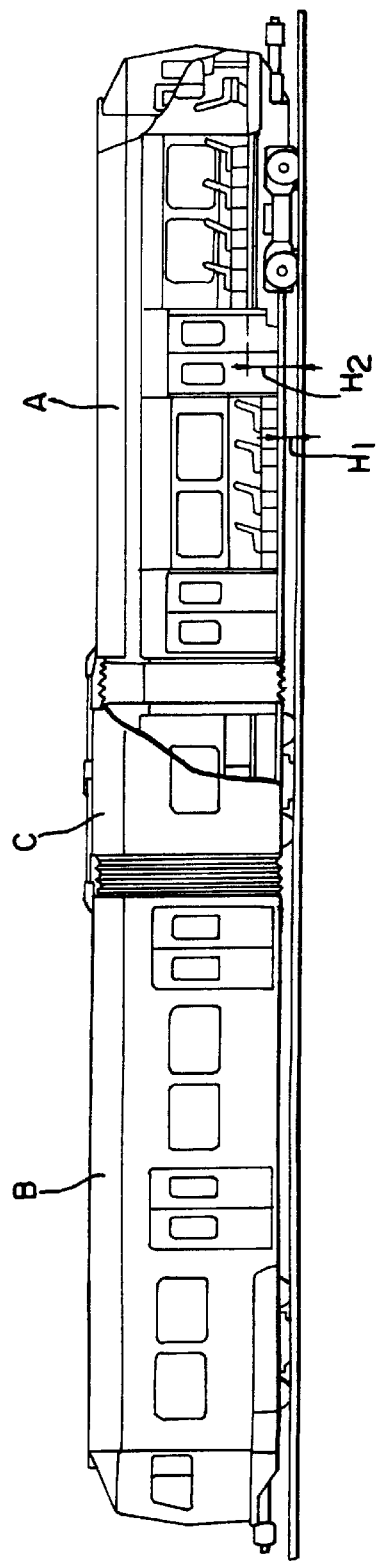

FIG. 1 shows a plan view (a) and front view (b) of a streetcar TR as an example of low-floor articulated car to which the invention is applicable with advantage.

This streetcar TR has an overall length of about 27 meters and comprises car A and car B, which have the same construction including a driving section, and car C which is about 3.5 meters long. In consideration of the ease of boading and unboading by elderly passengers and wheeled chair users, this streetcar is constructed as a low-floor-type car, typically measuring 350 mm in the height H1 from the top surface of the rail and the low floor and 890 mm in the height H2 from the top surface of the rail to the high floor. In addition, each of car A and car B is provided with wheels only in one position close to its forward end to allow free maneuvering.

In the streetcar TR illustrated in FIG. 1, the under-frame structure of the present invention has been applied to the junction JT between car B and car C and the junction JT between car C and car A.

Figure 2:
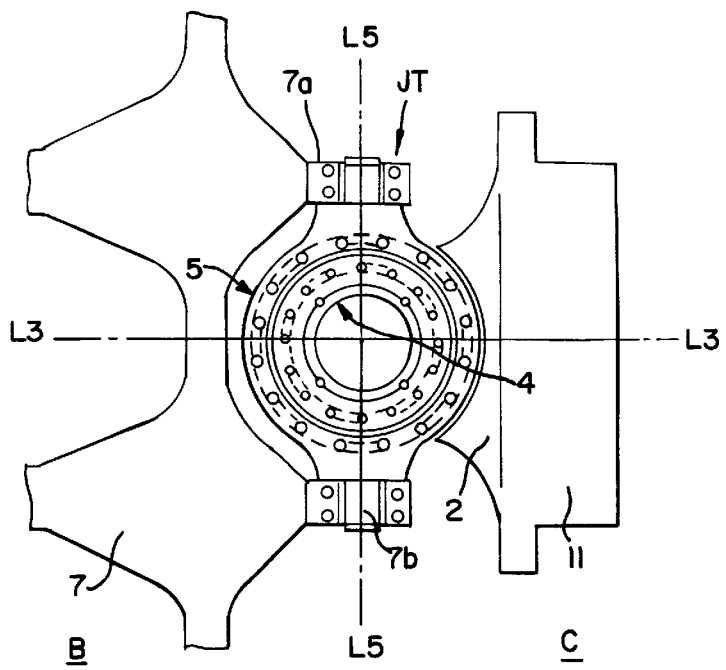
FIG. 2 is a schematic plan view showing a junction JT between car B and car C.
Figure 3:
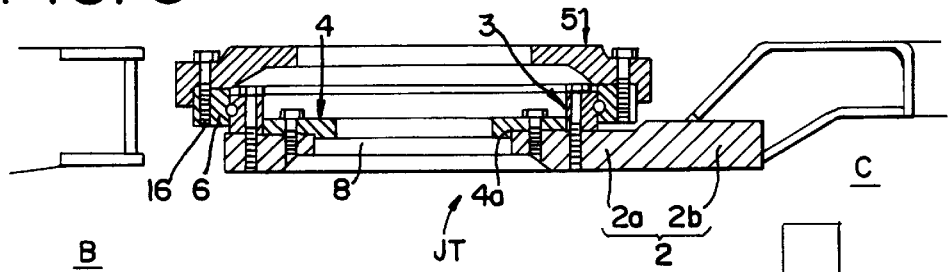
FIG. 3 is a schematic sectional view taken along the line L3—L3 of FIG. 2.

FIG. 2 is a schematic plan view showing the junction JT between car B and car C and FIG. 3 is a schematic cross-section view along the line L3—L3 of FIG. 2. Needless to say, a junction JT of the same construction as shown in FIGS. 2 and 3 is provided between car C and car A.

As illustrated in FIG. 3, the under-frame of junction JT comprises a planar coupling member 2 connected to car C, a bearing inner ring 3 secured rigidly to the upper side of the planar coupling member 2, a bearing inner step 4 secured rigidly to the planar coupling member 2 on the inner peripheral side of bearing inner ring 3, a generally planer bearing step 5 having a mounting arm means, a bearing outer ring 6 secured rigidly to the under-side of the bearing step 5, and an articular coupling member 7 connected to car B. The bearing inner ring 3, the bearing outer ring 6, and balls constitute a ball bearing.

Figure 4A:
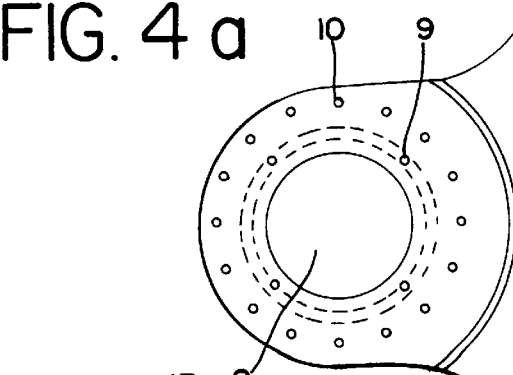
FIG. 4 shows a plan view (a) and front view (b) showing the mode of coupling of a planar coupling member.
Figure 4B:
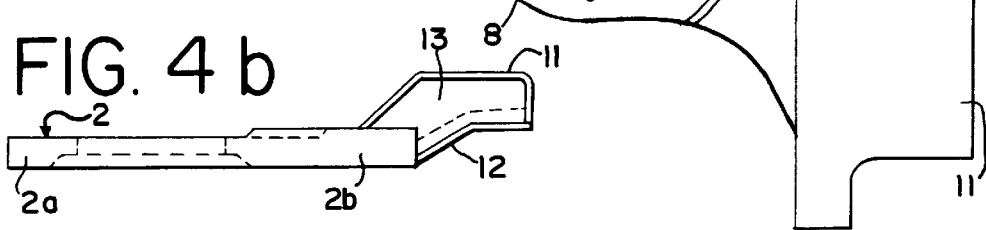

As illustrated in FIG. 4(b), the planar coupling member 2 is an integral structure consisting of a generally discoid body segment 2a and a generally rectangular mounting segment 2b and the body member 2a is centrally formed with an aperture 8 and two sets of setscrew holes 9, 10 in a concentric arrangement. Furthermore, the mounting segment 2b is welded to an upper plate 11 and a lower plate 12, which are integrated in a bracket-shaped formation in sectional view, with a reinforcing material 13 interposed between the upper plate 11 and lower plate 12.

In this embodiment wherein the body segment 2a of the planar coupling member 2 is provided with 16 setscrew holes 10, the bearing inner ring 3 is secured rigidly to the upper side of the planar coupling member 2 by means of said 16 setscrew holes 10. Similarly, in this embodiment wherein the body segment 2a is provided with 4 setscrew holes 9, the bearing inner step 4 is secured rigidly to the upper side of the planar coupling member 2 by means of said 4 setscrew holes 9.

As can be seen from FIG. 2 and FIG. 3, the bearing inner step 4 is an orificed discoid member and as this bearing inner step 4 is fitted to the inner peripheral side of the bearing inner ring 3, the strength of the car in its forward and reverse directions is secured. The bearing inner step 4 is formed with an axial land 4a which engages the orifice 8 of the planar coupling member 2.

Figure 5:
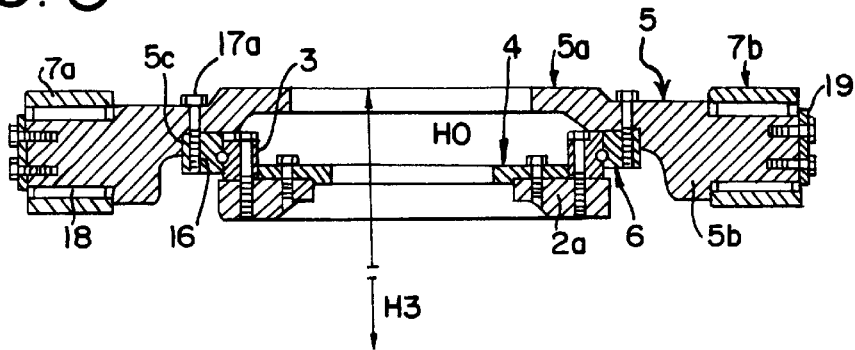
FIG. 5 shows a schematic sectional view taken along the line L5—L5 of FIG. 2.
Figure 6:
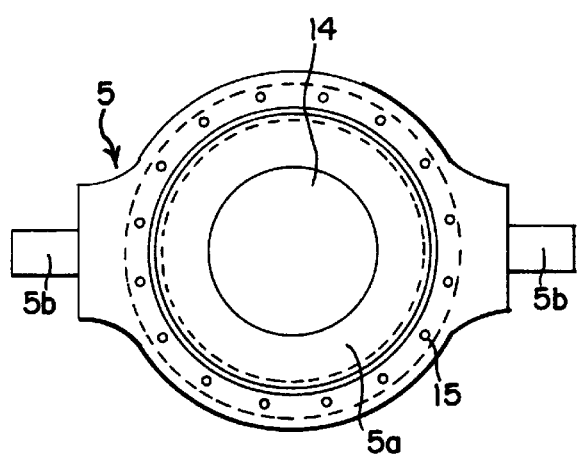
FIG. 6 shows a plan view (a) and right side view (b) of a bearing step.
Figure 6:
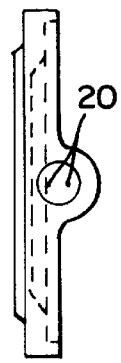

As illustrated in FIG. 5 and FIG. 6, the bearing step 5 comprises a generally discoid body segment 5a and a cylindrical mounting arm 5b on either side thereof. As shown in FIG. 6, the body segment 5a is centrally formed with an aperture 14 and, in this embodiment, 16 through-holes 15 in an annular arrangement. On the other hand, the bearing outer ring 6 is formed with setscrew holes 16 concentric with through-holes 15, whereby the bearing outer ring 6 is secured rigidly to the under-side of the bearing step 5 by means of said through-holes 15 and said setscrew holes 16.

As shown in FIG. 5, the body segment 5a of the bearing step 5 is displaced in an axially upward direction beyond the thickness of a bolt head 17a on the inner side of the through-hole 15. This construction, therefore, precludes projection of the bolt head 17a beyond the upper surface of the bearing step 5. Moreover, the body segment 5a of the bearing step 5 is thin-walled as compared with the remainder to constitute a downwardly-facing cavity HO in which the bearing 3, 6, bearing inner step 4, and the body segment 2a of the planar coupling member are accommodated. The bearing step 5 is formed with a recess 5c having the same inner diameter as the peripheral diameter of the bearing outer ring 6 and the bearing outer ring 6 is fitted into this recess 5c.

A rubber bearing 18 is fitted in each mounting arm 5b of the bearing step 5 (FIG. 5) and an articular coupling member 7 is rigidly secured to hold the outer periphery of the rubber bearing 18 (FIG. 2). The mounting arm 5b is provided with setscrew holes 20 for installing a cap 19 which retains the rubber bearing 18 in position.

Figure 7:
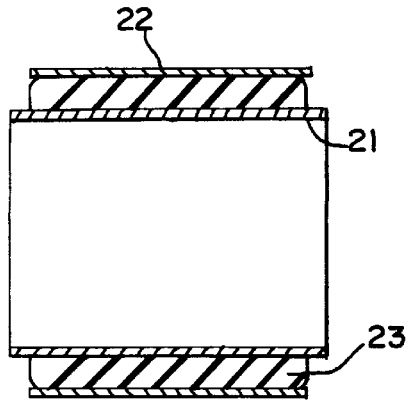
FIG. 7 shows a sectional view (a) and right side view (b) of a rubber bearing.
Figure 7:
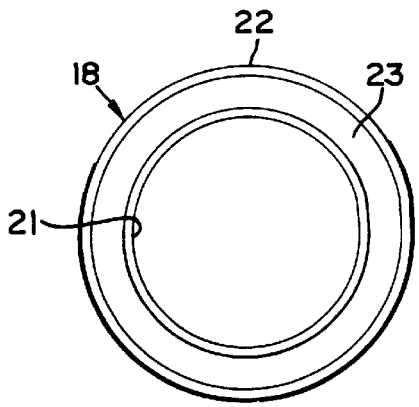

FIG. 7 shows a cross-section view (a) and side view (b) of the rubber bearing 18. This rubber bearing 18 comprises an inner cylinder 21, an outer cylinder 22 and a rubber material 23 interposed between the cylinders 21 and 22, presenting with an overall cylindrical conformation.

Since this rubber bearing 18 is sleeved over the mounting arm 5b of the bearing step 5 (FIG. 5), the inner diameter of the inner cylinder 21 is equal to the outer diameter of the mounting arm 5b. On the other hand, the axial length of the inner cylinder 21 is lightly shorter than that of the mounting arm 5b and the axial length of the outer cylinder 22 is further shorter than that of the inner cylinder 21.

FIGS. 8(a) and (b) shows the principal part of the articular coupling member 7 grasping the mounting arm 5b (not shown) of the bearing step 5 (not shown) through the rubber bearing 18 (not shown), in plan view (a) and sectional view (b). As can be seen from the plan view of FIG. 2, the articular coupling member 7 comprises two connecting arms 7a, 7b extending from car B (or car A) and each connecting arm 7a or 7b comprises an upper bearing step 24 and a lower bearing step 25 integrally coupled by hexagon bolts 26. Specifically, said upper bearing step 24 and lower bearing step 25 are provided with through-holes 24a and setscrew holes 25a, respectively, in concentric arrangement and as the hexagon bolts 26 are tightened into the setscrew holes 25a, the connecting arms 7a, 7b are integrated to grip the mounting arm 5b of the bearing step 5.

Figure 8:
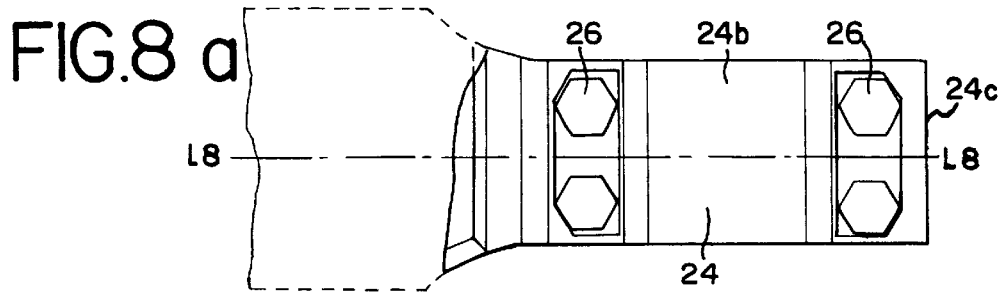
FIG. 8 shows a plan view (a) and cross-section view (b) taken along the line L8—L8 of FIG. 8(a) of the principal part of an articular coupling member.
Figure 8:
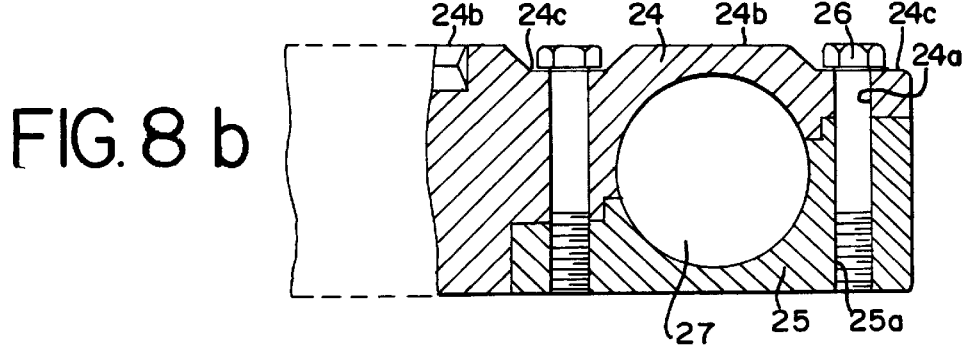
Figure 9:
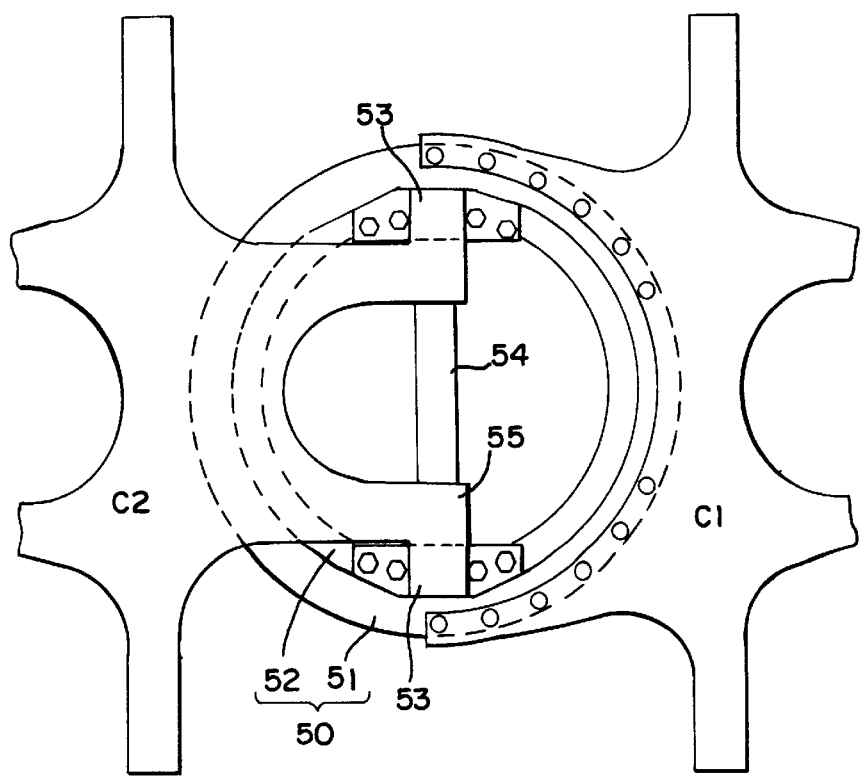
FIG. 9 is a plan view showing the conventional coupling under-frame.

As illustrated in FIG. 8, the upper bearing step 24 has a flat top end face 24b and, in the position where the through-holes 24a are formed, is formed with a groove 24c which is deeper than the head of the hexagon bolt 26. This construction precludes projection of the head of hexagon bolt 26 over the top end face 24b of the upper bearing step 24. The horizontal width L of the upper and lower bearing steps 24, 25 is equal to the axial length of the inner cylinder 21 of rubber bearing 18 and as the upper and lower bearing steps 21, 22 are integrally united, a cylindrical hole 27 of the same diameter as the outer diameter of the outer cylinder 22 of rubber bearing 18 is formed.

The above under-frame structure, unlike the conventional structure comprising a bearing and a connecting shaft-mounting segment simply built on a connecting arm extending out from car C, has a bearing step 5 having a unique shape so that the height H3 (FIG. 5) from the top surface of the rail to the top end face of the bearing step 5 can be decreased as compared with the prior art. In the illustrated embodiment, the height H3 is set at about 330 mm.

Furthermore, since this height H3 from the top level of the rail to the top end face of the bearing step 5 is equal to the height to the top end face 24b of the upper bearing step 24 and the height to the top end face of the upper plate 11, it is easy to install a low floor on top thereof. As mentioned above, the height from the top level of the rail to the top end face of the low floor is 350 mm.

What is claimed is:

1. An under-frame structure comprising:
    a first coupling member secured rigidly to a first car and projecting from said first car to a second car;,
    a bearing inner ring disposed on the first coupling member and secured rigidly to said first coupling member;

a bearing outer ring disposed through a roll means on the outer peripheral side of said bearing inner ring;

a coupling intermediate member which is disposed on the upper side of said bearing outer ring and to which said bearing outer ring is rigidly secured;

a second coupling member rigidly secured to said second car and projecting from said second car toward said first car to grip mounting arms of said coupling intermediate member; and said mounting arms of said coupling intermediate member being integral with a generally discoid body segment of said coupling intermediate member but positioned below a top end face of said body segment and projecting radially from either side of said body segment wherein the body segment of the coupling intermediate member has a central part displaced in an axially upward direction to form a flat top end face.

2. The under-frame structure claimed in claim 1 wherein said second coupling member has a pair of arms which grip the mounting arms of the coupling intermediate member through a bearing member.

3. The under-frame structure claimed in claim 2 wherein said arm has a flat top end face, the height of which is equal to the height of the top end face of said body segment.

* * * * *

UNITED STATES PATENT AND TRADEMARK OFFICE
CERTIFICATE OF CORRECTION

PATENT NO.    : 6,170,682 B1
DATED         : January 9, 2001
INVENTOR(S)   : Sugimoto et al.

It is certified that error appears in the above-identified patent and that said Letters Patent is hereby corrected as shown below:

<u>Title page,</u>
Assignee: The Kinki Sharyo Co. Ltd., Osaka Prefecture (JP)

Signed and Sealed this

Fifth Day of February, 2002

*Attest:*

JAMES E. ROGAN
*Director of the United States Patent and Trademark Office*

*Attesting Officer*